Aug. 25, 1931.  F. W. LOOMIS  1,820,813
DEVICE FOR TRAPPING AND EXTERMINATING INSECTS
Filed Dec. 4, 1929
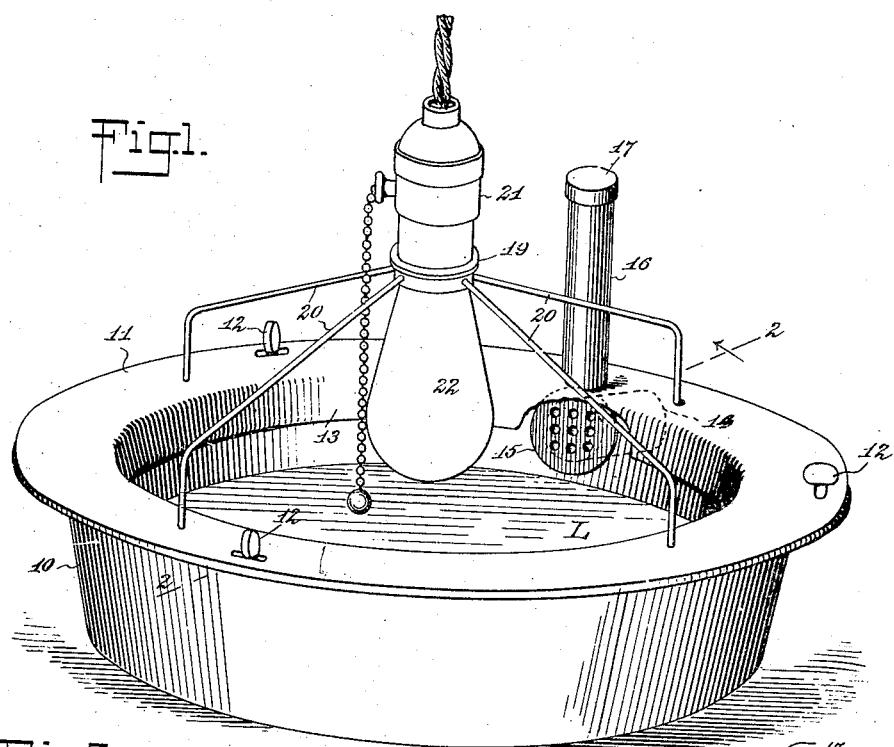
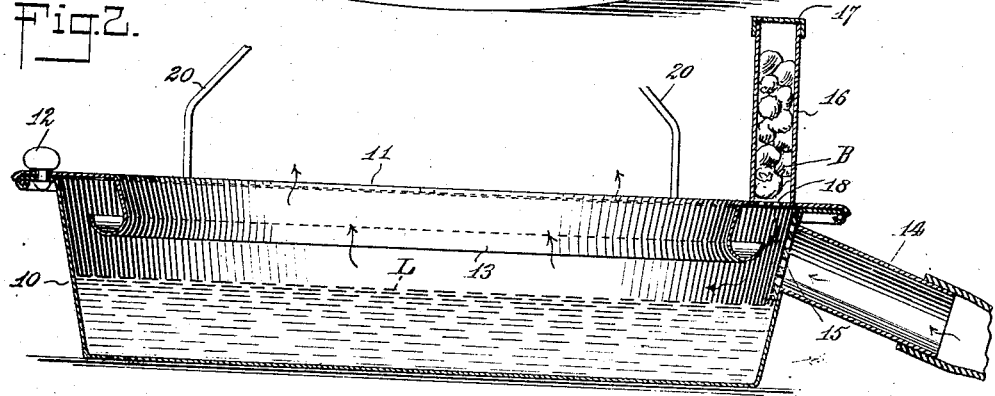
WITNESSES
INVENTOR
F. W. Loomis
BY
ATTORNEYS Patented Aug. 25, 1931

1,820,813

UNITED STATES PATENT OFFICE

FREDERICK WILLIAM LOOMIS, OF CHESTNUT HILL, CONNECTICUT

DEVICE FOR TRAPPING AND EXTERMINATING INSECTS

Application filed December 4, 1929. Serial No. 411,580.

This invention relates to a device designed and adapted for trapping and exterminating winged and other insects.

The principal object of the invention is the provision of a device of the indicated character which will be simple of construction, inexpensive of manufacture, and effectual in use.

The nature of the invention and its distinguishing features and advantages will appear when the following specification is read in connection with the accompanying drawings, in which Figure 1 is a perspective view of a device embodying the features of the invention, a portion being broken away to more clearly show one of the features;

Figure 2 is a section taken on the line 2—2 of Figure 1.

Referring now more particularly to the drawings it will be apparent that the device includes a suitable container or receptacle 10, which is in the form of a pan in the present instance made of suitable weatherproof material. The pan serves for containing a suitable liquid substance for exterminating insects which drop or are drawn into the pan. A suitable guard or barrier 11 is applied to the rim of the pan 10, and in the present instance is accomplished by the use of suitable fastening elements in the form of turn-buttons 12. The guard or barrier 11 has a depending flange 13 disposed inside of the pan 10, and the lower edge of said flange 13 is turned outwardly and upwardly. The said guard or barrier 11 serves for the purpose of preventing insects which have fallen into the liquid from escaping by crawling out of the pan along the side wall thereof. Extending from the side wall of the pan 10 some distance below the rim thereof is a tube 14. A strainer 15 is arranged over the end of the tube 14 which joins the side wall of the pan 10. The tube 14 is intended for connection with a suitable suction device or blower for a purpose to be explained. A container 16 of suitable size is positioned on the guard or barrier 11. This container 16 has a removable cover 17. The bottom of the container has a plurality of holes 18. The container 16 serves for the purpose of holding suitable bait, which may be of any kind, such as foodstuff. The container 16 is arranged close to the tube 14.

From the foregoing it will be apparent that a current of air may be sent through the tube 14, which will affect the bait in the container 16, to send forth an odor or scent, which will attract the insects. When the insects are in close proximity to the pan 10 above the same, they may be forcefully drawn into the pan, by inducing a suction action in the tube 14 which will be felt directly above the pan 10. In this way the insects will be subjected to the exterminating effect of the liquid in the pan 10. It will be apparent the strainer 15 will prevent the insects from being drawn through the tube 14. It will also be apparent that the guard or barrier 11 may be readily removed to empty the pan 10 whenever the occasion arises. It will also be apparent that the exterminating liquid may be drawn off through the tube 14 by canting the pan 10, leaving the exterminated insects inside of the pan, thus separating the insects from the liquid, which may be used over again.

In accordance with another feature of the invention, the device is adapted to be suspended from an electric lamp which serves as a lure in addition to the bait within the container 16. In the present instance, to accomplish this end, there is provided a ring 19 supported by radial members 20, which are connected with the ring 19 and with the guard or barrier 11. The ring 19 is disposed centrally above the pan 10, so that when the ring 19 is applied to the socket 21 of an electric lamp 22, the pan will be suspended below the lamp 22, as shown most clearly in Figure 1.

It is to be understood that the invention is not restricted to the precise arrangement of parts shown and described, as details of construction may be modified and rearranged without departing from the spirit of the invention, the scope of which is limited only by the terms of the appended claims.

I claim:

1. In a device of the class described, the combination of an open top receptacle, a bait holder of hollow construction provided with openings positioned on said receptacle, and a tube in communication with the interior of the receptacle in proximity to said bait holder, whereby to optionally induce an inflowing or outflowing current of air with respect to the interior of said receptacle.

2. A device having the combination of a rim constituting a guard or barrier for a pan or similar receptacle, means to attach the rim to the open end of the pan, and a bait container on said rim within the outer edge thereof and having openings in the bottom which may communicate with the interior of the pan.

3. A device having the combination of a rim constituting a guard or barrier for a pan or similar receptacle, means for suspending said rim to the open end of the pan, and a bait container on said rim within the outer edge thereof and having openings in the bottom which may communicate with the interior of the pan.

4. A device having the combination of an annular member having an outwardly and upwardly turned flange constituting a guard or barrier for a pan-like receptacle, means to attach said annular member to the open end of said receptacle, and a bait container on said annular member within the outer edge thereof and having openings in the bottom which may communicate with the interior of the pan.

FREDERICK WILLIAM LOOMIS.